Patented Dec. 7, 1948

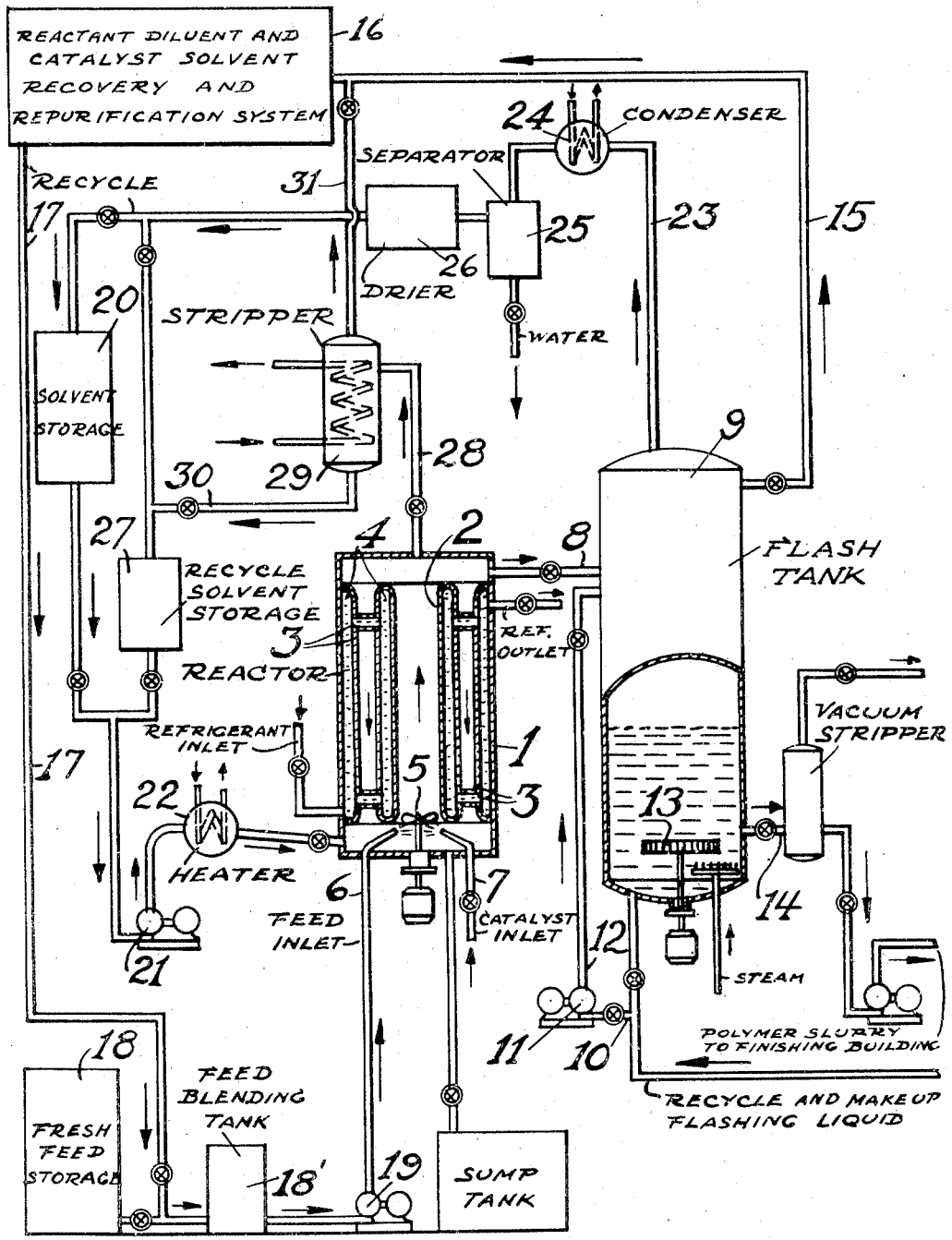

2,455,665

UNITED STATES PATENT OFFICE 2,455,665

LOW-TEMPERATURE POLYMERIZATION PROCESS

William W. Ford and Fred D. Thiel, Baton Rouge, La., assignors to Standard Oil Development Company, a corporation of Delaware Application February 24, 1945, Serial No. 579,574

20 Claims. (Cl. 260—86)

The present invention pertains to the production of polymers and particularly to the production of high molecular weight polymers from isoolefins or mixtures of isoolefins with copolymerizable materials such as diolefins, vinyl benzenes and the like at low temperatures and in the presence of Friedel-Crafts type catalysts.

High molecular weight polymers having a molecular weight as determined by the Staudinger method of from about 25,000 up to 200,000 to 300,000 or more have been obtained by polymerizing isoolefins, such as isobutylene, by contact with a Friedel-Crafts type catalyst at temperatures below about 10° F. Modified polybutenes containing at most about 10% of a vinyl benzene such as styrene or the like have also been prepared by polymerizing mixtures of isobutylene and styrene in substantially the same way. More recently copolymers which are curable with sulfur have been prepared by treating mixtures of an isoolefin such as isobutylene and a diolefin such as butadiene or isoprene with a solution of a Friedel-Crafts type catalyst in a non-complex forming, low-freezing solvent such as methyl or ethyl chloride, carbon disulfide and the like at temperatures ranging from about 10° F. to about —250° F., preferably at temperatures between —40° F. and —150° F.

It has, in general, been found advantageous to carry out these reactions in reactors provided with suitable heat exchange surfaces and means for maintaining the reactants well agitated. A major difficulty encountered in the operation of these processes has been the fact that the polymer formed being insoluble in the reaction mixture has a tendency to deposit in the reactor circulatory system and on the heat exchange surfaces. This is highly objectionable since it not only reduces the heat transfer coefficient of the reactor but it also interferes with the circulation of the reaction mixture eventually plugging all or a substantial part of the reactor. It is necessary, therefore, periodically to stop the polymerization and remove these polymer deposits. Removal of the deposits by hand is difficult and at times impossible. Removal of the deposits by the introduction of a suitable solvent for the polymer such as a straight run naphtha results in losses of reactants, diluent and polymer and necessitates taking the reactor off stream for rather prolonged periods, warming the same from a temperature of —140° F. to +120° F., following which the reactor is difficultly recooled.

It is the object of this invention to provide the art with a method whereby reactors used for the preparation of high molecular weight, low temperature polymers from isoolefins or mixtures of isoolefins with certain copolymerizable materials may be freed from adhering polymer in a facile manner.

It is also the object of this invention to provide the art with a method whereby polymerization reactors used in the production of high molecular weight isoolefin polymers or copolymers may be kept on stream for considerably a greater percentage of the time than has been possible heretofore.

These and other objects will appear more clearly from the detailed description and claims which follow.

It has now been found that reactors used for the production of high molecular weight polymers and copolymers of isoolefins can be advantageously cleaned and the heat transfer coefficient of the reactor substantially restored to its original value by cutting off the supply of catalyst to the reactor and continuing the supply of feed as usual to the reactor, preferably while permitting the temperature of the reactor to rise as, for example, by cutting off the supply of refrigerant to the reactor cooling jacket. Although the fresh feed has no substantial solvent power for the polymer even at temperatures well above the ordinary reaction temperature, it has been found that the fresh feed effectively removes the polymer particles from the reactor surfaces and permits withdrawal of the polymer from the reactor in the form of a suspension of gel-like particles in the feed mixture. In this way, the reactor need be shut down for only a very brief interval to permit restoration of the heat transfer coefficient of the reactor to substantially its original value and with no interruption of the polymer recovery and recycle purification system in view of the fact that the cleansing agent is essentially the same as the material passing through this equipment in the ordinary conduct of the polymerization process. In view of the fact that the fresh feed flushing is incapable of completely freeing the reactor surfaces of all deposited polymer, it is necessary, after several fresh feed flushing operations, to shut off the supply of reactants and cleanse the reactor with a solvent for the polymer in a known manner. Although solvent cleansing is a rather time-consuming operation, the number of shutdowns and solvent cleansings is materially reduced by the fresh feed flushing operation of the present invention and accordingly the service factor for the reactors is increased.

Apparatus suitable for the conduct of the present process is illustrated in the accompanying drawing, wherein the single figure shows a flow plan in accordance with the present invention.

In the drawing 1 is a heat exchanger type of reactor comprising a central draft tube 2 and an annular return passageway 3 both of which are surrounded by a refrigerant jacket 4 through which a suitable refrigerant such as liquid ethylene is circulated. An inlet for liquefied refrigerant such as liquid ethylene is provided near the bottom of the refrigerant jacket and an outlet for vaporized refrigerant is arranged near the top of the jacket. Suitable means (not shown) are provided for controlling the temperature of the refrigerant such as variable back pressure valves and heat exchangers if necessary. In lieu of providing an annular passageway as shown, the return passageway may be constructed in the form of a plurality of tubes of suitable diameter. A motor-driven agitator 5 is arranged at the bottom of the central draft tube for imparting the necessary agitation to the contents of the reactor and to effect circulation of the contents through the central draft tube and the return passageway. A feed inlet 6 and a catalyst inlet 7 are provided in the vicinity of the agitator 5 in order that both may be introduced into the reactor at a point of maximum turbulence. An overflow line 8 is provided for the discharge of polymer slurry in cold reaction liquid from the reactor and connects with a flash tank 9.

The flash tank 9 is about one-third filled with a heated flashing liquid, preferably water, at about 150° F., which serves to flash off the volatiles contained in the slurry discharged from the reactor through line 8. The flashing liquid is circulated through line 10, pump 11 and line 12 into the flash tank adjacent the outlet from line 8, the stream of flashing liquid impinging against and breaking up the stream of polymer slurry entering the flash tank. An agitator 13 driven by a motor or any suitable source of power is provided in order to maintain the polymer in suspension in the flashing liquid, an outlet 14 being provided for withdrawing the slurry of polymer in flashing liquid from the flash tank and passing it to the vacuum stripper and thence to the polymer separation and finishing equipment.

An outlet pipe 15 is provided at the top of the flash tank 9 connecting with the recycle recovery and repurification equipment 16 for leading the vaporized material from the flash tank to the recovery equipment wherein the vaporized materials, i. e., isoolefin, diluent, catalyst solvent and the like are compressed, dried, reliquefied and purified in order that they may be recycled in the process. A line 17 is shown through which the recovered reactants may be returned to the reactor, preferably in combination with fresh feed from the storage tank 18 through feed blending tank 18' and if necessary through a pump 19 and feed inlet 6.

As noted above, it becomes necessary periodically to cleanse the reactor surfaces by means of a suitable solvent. For this purpose, there is provided a solvent storage tank 20 which is connected through pump 21 and heater 22 with the bottom of the reactor. The solvent may be recovered in different ways. If the solvent is sufficiently volatile and rich in polymer it may be desirable to discharge the solvent through line 8 into flash tank 9. By selecting as solvents materials having a boiling point below the temperature maintained in the flashing liquid, the solvent can be completely vaporized in the flash tank. The vapors are taken overhead through line 23, cooled in condenser 24 and passed into the separator 25 to remove the condensed water whereupon the vapors are passed through an absorber 26 to remove the last traces of water. The solvent is then passed to the solvent storage tank 20 or to the recycle solvent storage tank 27.

Instead of passing the solvent to the flash tank 9, it may be taken directly from the reactor through line 28 passed to stripper 29 wherein materials such as isoolefins, diolefins, diluents, etc. are stripped out by heating the mixture to a temperature well above the boiling point of the low boiling materials but below the temperature at which appreciable quantities of solvent will be vaporized, whereupon the stripped solvent is passed to recycle solvent storage or immediately recycled to the reactor to dissolve further quantities of polymer. The materials stripped out in 29 may be taken overhead in line 31 and passed into the recovery and repurification system 16.

The method of operation in accordance with the present invention is as follows when preparing copolymers of polyisobutylene and a conjugated diolefin such as isoprene.

Fresh feed comprising one part of a 97/3 mixture of isobutylene and isoprene and from one to five parts of methyl chloride is fed into the reactor 1 through line 6. A material such as liquid ethylene is supplied to the refrigerant jacket and a back pressure substantially equal to atmospheric pressure is maintained on the ethylene which boils under such pressure at about —155° F. When the reactor is filled, the contents overflow into line 8 and thence into the flash tank 9 containing water at about 150° F. wherein the volatile materials are vaporized, withdrawn through line 15 and recovered in the purification system 16. The agitator 5 is placed in operation and when the reactor and contents reach an equilibrium temperature at about —140° F., a precooled solution of aluminum chloride in methyl chloride containing about 0.1 to 0.4% of AlCl₃ is introduced into the reactor through line 7. A slurry of polymer in cold reaction liquid is formed and overflows through line 8 into the flash tank wherein the volatiles, i. e., unreacted isobutylene and isoprene as well as methyl chloride, are vaporized and withdrawn through line 15 and recovered as by compressing, drying, fractionating, etc., while the solid polymer particles are dispersed in the heated water. A slurry of polymer particles in water is withdrawn from the flash tank and is passed to suitable recovery and finishing equipment.

After a period of operation of from about 20 to about 100 hours in the case of an annular return type reactor, or from about 12 to about 40 hours in the case of a return tube type of reactor, the reactor surfaces become more or less covered with a film of polymer which cuts down materially on the heat transfer efficiency of the reactor and thereby the yield obtainable therefrom. When this condition is reached, the supply of catalyst to the reactor is cut off without altering the character or the amount of feed to the reactor. As the supply of catalyst is stopped, the supply of ethylene to the refrigerant jacket is cut off permitting the temperature of the reactor and contents to rise to about —20° F. to 0° F. After about ½ to about 4 hours and, on the average, after about 2 hours at this temperature, the surfaces are substantially clean, whereupon the supply of refrigerant to the cooling jacket is resumed, thus permitting the apparatus to cool down to reaction temperature. When equilibrium is reached, catalyst solution is again introduced and the production of polymer is resumed.

After several runs, following which the reactor has been flushed with warm feed, it generally becomes necessary to clean the reactor thoroughly with a true solvent for the polymer. At this time the supply of catalyst and of refrigerant is shut off while continuing the supply of feed to flush out the reactor. The fresh feed supply is then shut off and a suitable solvent such as a straight run naphtha is withdrawn from solvent storage 20, pumped through a heater 22 and into the reactor, displacing the feed in the reactor, the contents of which continue to overflow into the flash tank 9. Alternatively, the reactor contents could be dumped into a sump tank or the like from which the reactants, diluents, etc. could be reclaimed by vaporizing the same and passing the vapors to the recovery and repurification system.

In order to obtain a maximum removal of polymer with a given quantity of solvent, overflow line 8 can be closed off and the solvent circulated through the reactor 1, the stripper 29, recycle storage 27 and heater 22 until it contains about 5% of polymer, whereupon the polymer containing solvent is withdrawn and used as fuel or is processed for the recovery of polymer and polymer-free solvent for reuse in the cleaning operation.

When the reactor surfaces are completely cleaned, the solvent is removed from the reactor and the latter is then flushed out with clean solvent which is then blown out into a suitable storage drum. The introduction of refrigerant to the cooling jacket is then resumed and fresh feed is introduced through line 6, the agitator started and when the reactor contents are at the desired temperature level, catalyst solution may be introduced, whereupon the formation of polymer is resumed.

The process of this invention may be applied to the cleaning of reactors used for the preparation of solid high molecular weight low temperature polymerizates from isoolefinic materials alone or from mixtures of a major proportion of isoolefinic materials and a minor proportion of a vinyl benzene or a diolefinic or polyolefinic hydrocarbon which is capable of copolymerizing with said isoolefins. The preferred isoolefin is isobutylene but other isoolefins containing up to 8 carbon atoms per molecule may be used. The copolymerizable materials include styrene, alpha-methyl styrene, para-methyl styrene, alpha-methyl, para-methyl styrene, chloro-styrenes, butadiene and substituted butadienes, especially isoprene, piperylene and dimethylbutadiene and methyl pentadiene. Other polyolefinic materials containing up to 12 or 14 carbon atoms per molecule such as myrcene and certain non-conjugated diolefins such as dimethylallene and the like are also useful. The ratio of isoolefin to vinyl benzenes is from about 90–99 weight per cent of isoolefin to about 10 to 1 weight per cent of vinyl benzene. The ratio of isoolefin to diolefin in the liquid is from about 50 to 99 weight per cent of isoolefin to 50 to 1 weight per cent of diolefin in the case of butadiene. With $C_5$ and higher diolefins the amount of diolefin is less than 10 weight per cent and usually less than 5 weight per cent.

The feed mixture ordinarily comprises one part of olefinic mixtures of the foregoing compositions in from one to five parts of an inert diluent such as methyl or ethyl chloride or the like.

The olefinic materials are preferably cooled to temperatures below about $-40°$ F. and polymerized by the addition of a Friedel-Crafts type catalyst dissolved in a low-freezing, noncomplex-forming solvent such as methyl-, ethyl- or propyl-mono or polyhalides, carbon disulfide or the like. The reactants, catalysts, solvents and the like and the general properties of the polymers formed are described in detail in U. S. Patent No. 2,203,873, dated June 11, 1940 and in Australian Patent No. 112,875, issued July 31, 1941.

Solvents which may be used for cleaning the reactor after several warm feed flushings include materials such as straight run naphthas, hexane, benzene, carbon tetrachloride or the like and, in general, any material having a strong solvent power for the polymers but which does not exert a poisoning effect upon the polymerization reaction.

The following example is illustrative of the present invention.

*Example*

A reactor which was indirectly cooled to about $-140°$ F. by means of liquefied ethylene was charged with approximately 11,000 pounds per hour of feed containing 30% isobutylene, 2.5% isoprene and 67.5% methyl chloride. 700 pounds per hour of catalyst solution consisting of methyl chloride containing 0.15% of aluminum chloride were supplied to the reactor and the yield of polymer was approximately 2300 pounds per hour. The supply of catalyst solution and ethylene to the reactor was stopped periodically and the supply of fresh feed was cut to about 3000 lbs. per hour and the reactor permitted to warm up to about $-20$ to $0°$ F. in order to cleanse the reactor surfaces of films of polymer.

During 192 hours of overall operation, 36 hours were passed in five hot feed flushing cycles and 156 hours in six reaction cycles. The average length of the reaction cycles was therefore 26 hours and the overall service factor would be $156/192$ or 81.3%. A washing of the reactor with a heated straight run naphtha requires approximately 16 hours and during 192 hours of overall operation with four naphtha cleansing cycles totaling 62 hours and 130 hours in five reaction cycles, the service factor would be only 67.7%.

The cleansing action of the warm feed on the reactor surfaces is most surprising in view of the lack of solvent power of that feed for the polymer. The non-solvency of the feed is shown by the following test. Twenty-five gram samples of the polymer formed as above were place in 1000 ml. of the feed disclosed above and maintained at $-20°$ F. . The amount of rubber in the feed mixture was determined after 30 minutes and after 60 minutes and was found to be 0.02 wt. per cent and 0.03 wt. per cent respectively.

The foregoing description contains a limited number of embodiments of the present invention. It will be understood, however, that such embodiments are intended only to be illustrative since numerous variations are possible without departing from the purview of this invention as defined in the following claims.

What we claim and desire to secure by Letters Patent is:

1. A polymerization process comprising polymerizing an unsaturate having at least one ethylenic double linkage and from 4 to 14 carbon atoms per molecule by contact with a Friedel-Crafts catalyst at temperatures between −40° F. and −150° F. in a reaction mixture having no appreciable solvent power for the polymer even at temperatures well above the reaction temperature in a heat exchanger reactor, discontinuing the supply of catalyst when the reactor surfaces become coated with a film of polymer, continuing the addition of fresh feed and permitting the temperature of the reactor to rise to −20° F. to 0° F. and maintaining the reaction mixture substantially free from catalyst under agitation in said reactor until the polymer fouling the surfaces of the reactor is substantially completely dispersed in the reaction mixture and removed therein discharging the unpolymerized feed mixture and dispersed polymer from the reactor to means for recovering the separated polymer and the unpolymerized feed without contamination of any thereof by impurities, and thereafter, cooling the reactor to reaction temperatures within the range between −40° F. and −150° F. and adding catalyst to the reaction mixture.

2. A polymerization process which comprises continuously supplying a reaction mixture comprising an unsaturate having at least one ethylenic double linkage and from 4 to 14 carbon atoms per molecule to a reactor, cooling the reaction mixture to a temperature between −40° F. and −150° F., adding a Friedel-Crafts catalyst to the reaction mixture thereby polymerizing the isoolefinic material to solid polymers which are substantially insoluble in the reaction mixture even at temperatures well above reaction temperature, discontinuing the addition of catalyst when the reactor surfaces become coated with a film of polymer, continuing the addition of reaction mixture and permitting the temperature of the reactor to rise to −20° F. to 0° F., maintaining reaction mixture substantially free from catalyst under agitation in said reactor until the polymer fouling the surfaces of the reactor is substantially completely dispersed in the reaction mixture discharging the feed and dispersed polymer to means for separately recovering the polymer and the feed substances without contamination thereof, cooling the reactor to reaction temperatures between −40° F. and −150° F. and resuming the introduction of catalyst into the reaction mixture.

3. A polymerization process which comprises continuously supplying a reaction mixture comprising a major proportion of an isoolefin having from 4 to 8 inclusive carbon atoms per molecule and a minor proportion of a multiolefin having from 4 to 14 carbon atoms per molecule and a diluent which has a freezing point below polymerization temperature and is inert with respect to the unsaturates and the catalyst to a heat exchanger of reactor, cooling the reaction mixture to a temperature between −40° F. and −150° F., adding a Friedel-Crafts catalyst to the reaction mixture thereby polymerizing the olefinic materials present to solid polymers which are substantially insoluble in the reaction mixture even at temperatures of −20° F. to 0° F., discontinuing the addition of catalyst when the reactor surfaces become coated with a film of polymer, continuing the addition of reaction mixture and permitting the temperature of the reactor contents to rise to −20° F. to 0° F., maintaining the reaction mixture within this temperature range and substantially free from catalyst under agitation until the polymer fouling the surfaces of the reactor is substantially completely dispersed in and carried away by the reaction mixture discharging the unpolymerized feed and dislodged polymer to means for separately recovering the polymer and the feed without contamination thereof, cooling the reactor to reaction temperatures between −40° F. and −150° F. and resuming the introduction of catalyst into the reaction mixture.

4. A polymerization process which comprises continuously supplying a reaction mixture comprising a major proportion of an isoolefin having from 4 to 8, inclusive, carbon atoms per molecule and a minor proportion of a copolymerizable polyolefinic material having from 4 to 14 carbon atoms per molecule and a diluent which has a freezing point below polymerization temperature and is inert with respect to the unsaturates and the catalyst to a heat exchanger of reactor, cooling the reaction mixture to a temperature between −40° F. and −150° F., adding a solution of a Friedel-Crafts catalyst in a solvent which is liquid at reaction temperature and does not form a complex with the catalyst to the reaction mixture thereby polymerizing the olefinic materials present to solid polymers which are substantially insoluble in the reaction mixture even at temperatures of −20° F. to 0° F., discontinuing the addition of catalyst when the reactor surfaces become coated with a film of polymer, continuing the addition of reaction mixture and permitting the temperature of the reactor contents to rise to −20° F. to 0° F., maintaining the reaction mixture within this temperature range and substantially free from catalyst under agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature within the range between −40° F. and −150° F. and resuming the introduction of catalyst into the reaction mixture.

5. A polymerization process which comprises continuously supplying a reaction mixture comprising a major proportion of isobutylene and a minor proportion of a conjugated diolefin hydrocarbon containing 4 to 6 carbon atoms per molecule and a diluent which has a freezing point below polymerization temperature and is inert with respect to the unsaturates and the catalyst to a heat exchanger of reactor, cooling the reaction mixture to a temperature between −40° F. and −150° F., adding a solution of a Friedel-Crafts catalyst in a solvent which is liquid at reaction temperature and does not form a complex with the catalyst to the reaction mixture thereby polymerizing the olefinic materials present to solid polymers which are substantially insoluble in the reaction mixture even at temperatures of −20° F. to 0° F., discontinuing the addition of catalyst when the reactor surfaces become coated with a film of polymer, continuing the addition of reaction mixture and permitting the temperature of the reactor contents to rise to −20° F. to 0° F., maintaining the reaction mixture within this temperature range and substantially free from catalyst under a high degree of agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature between −40° F. and —150° F. and resuming the introduction of catalyst into the reaction mixture.

6. A polymerization process which comprises continuously supplying a reaction mixture comprising a major proportion of isobutylene and a minor proportion of a vinyl aromatic compound and a diluent which has a freezing point below polymerization temperature and is inert with respect to the unsaturates and the catalyst to a heat exchanger of reactor, cooling the reaction mixture to a temperature between —40° F. and —150° F., adding a solution of a Friedel-Crafts catalyst in a solvent which is liquid at reaction temperature and does not form a complex with the catalyst to the reaction mixture thereby polymerizing the olefinic materials present to solid polymers which are substantially insoluble in the reaction mixture even at temperatures of —20° F. to 0° F., discontinuing the addition of catalyst when the reactor surfaces become coated with a film of polymer, continuing the addition of reaction mixture and permitting the temperature of the reactor contents to rise to —20° F. to 0° F., maintaining the reaction mixture within this temperature range and substantially free from catalyst under agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature between —40° F. and —150° F. and resuming the introduction of catalyst into the reaction mixture.

7. A polymerization process which comprises continuously supplying a reaction mixture comprising a major proportion of isobutylene and a minor proportion of butadiene in from an equal to a fivefold quantity of an alkyl halide containing less than 4 carbon atoms per molecule to a heat exchanger of reactor, cooling the reaction mixture to a temperature between —40° F. and —150° F. by supplying a suitable refrigerant in indirect heat exchange relation to the reaction mixture, adding a solution of a Friedel-Crafts catalyst in an alkyl halide containing less than 4 carbon atoms per molecule to the reaction mixture thereby polymerizing the reactants to solid polymers which are substantially insoluble in the reaction mixture even at temperatures of —20° F. to 0° F., discontinuing the addition of catalyst when the reactor surfaces become coated with a film of polymer, continuing the addition of reaction mixture and permitting the temperature of the reactor contents to rise to —20° F. to 0° F., maintaining the reaction mixture within this temperature range and substantially free from catalyst under agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature between —40° F. and —150° F. and resuming the introduction of catalyst into the reaction mixture.

8. A polymerization process which comprises continuously supplying a reaction mixture comprising a major proportion of isobutylene and a minor proportion of isoprene in from an equal to a fivefold quantity of an alkyl halide containing less than 4 carbon atoms per molecule to a heat exchanger of reactor, cooling the reaction mixture to a temperature between —40° F. and —150° F. by supplying a suitable refrigerant in indirect heat exchange relation to the reaction mixture, adding a solution of a Friedel-Crafts catalyst in an alkyl halide containing less than 4 carbon atoms per molecule to the reaction mixture thereby polymerizing the reactants to solid polymers which are substantially insoluble in the reaction mixture even at temperatures of —20° F. to 0° F., discontinuing the addition of catalyst when the reactor surfaces become coated with a film of polymer, continuing the addition of reaction mixture and permitting the temperature of the reactor contents to rise to —20° F. to 0° F., maintaining the reaction mixture within this temperature range and substantially free from catalyst under agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature between —40° F. and —150° F. and resuming the introduction of catayIst into the reaction mixture.

9. A polymerization process which comprises continuously supplying a reaction mixture comprising a major proportion of isobutylene and a minor proportion of styrene in from an equal to a fivefold quantity of an alkyl halide containing less than 4 carbon atoms per molecule to a heat exchanger of reactor, cooling the reaction mixture to a temperature between —40° F. and —150° F. by supplying a suitable refrigerant in indirect heat exchange relation to the reaction mixture, adding a solution of a Friedel-Crafts catalyst in an alkyl halide containing less than 4 carbon atoms per molecule to the reaction mixture thereby polymerizing the reactants to solid polymers which are substantially insoluble in the reaction mixture even at temperatures of —20° F. to 0° F., discontinuing the addition of catalyst when the reactor surfaces become coated with a film of polymer, continuing the addition of reaction mixture and permitting the temperature of the reactor contents to rise to —20° F. to 0° F., maintaining the reaction mixture within this temperature range and substantially free from catalyst under agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature between —40° F. and —150° F. and resuming the introduction of catayIst into the reaction mixture.

10. The process as defined in claim 7 wherein the alkyl halide is methyl chloride.

11. The process as defined in claim 8 wherein the alkyl halide is methyl chloride.

12. The process as defined in claim 9 wherein the alkyl halide is methyl chloride.

13. A polymerization process which comprises continuously supplying a reaction mixture comprising a major proportion of an isoolefin having 4 to 18 carbon atoms per molecule and a minor proportion of a copolymerizable polyolefinic material having from 4 to 14 carbon atoms per molecule and a diluent which has a freezing point below polymerization temperature and is inert with respect to the unsaturates and the catalyst to a heat exchanger of reactor, cooling the reaction mixture to a temperature between —40° F. and —150° F., adding a solution of a Friedel-Crafts catalyst in a solvent which is liquid at reaction temperature and does not form a complex with the catalyst to the reaction mixture thereby polymerizing the olefinic materials present to solid polymers which are substantially insoluble in the reaction mixture even at temperatures of —20° F. to 0° F., discontinuing the addition of catalyst when the reactor surfaces become coated with a film of polymer, continuing the addition of reaction mixture and permitting the temperature of the reactor contents to rise to —20° F. to 0° F., maintaining the reaction mixture within this temperature range and substantially free from catalyst under agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature between —40° F. and —150° F., resuming the introduction of catalyst into the reaction mixture, repeating the foregoing cycle several times then shutting off the supply of feed mixture, catalyst and refrigerant to the reactor, thoroughly cleansing the reactor surfaces with a heated solvent for the polymer formed, flushing out residual solvent, resuming the supply of refrigerant and feed mixture to the reactor and resuming the introduction of catalyst solution to the reactor when the contents reach reaction temperature between —40° F. and —150° F.

14. A polymerization process which comprises continuously supplying a reaction mixture comprising a major proportion of isobutylene and a minor proportion of a conjugated diolefin hydrocarbon containing 4 to 6 carbon atoms per molecule and a diluent which has a freezing point below polymerization temperature and is inert with respect to the unsaturates and the catalyst to a heat exchanger of reactor, cooling the reaction mixture to a temperature between —40° F. and —150° F., adding a solution of a Friedel-Crafts catalyst in a solvent which is liquid at reaction temperature and does not form a complex with the catalyst to the reaction mixture thereby polymerizing the olefinic materials present to solid polymers which are substantially insoluble in the reaction mixture even at temperatures of —20° F. to 0° F., discontinuing the addition of catalyst when the reactor surfaces become coated with a film of polymer, continuing the addition of reaction mixture and permitting the temperature of the reactor contents to rise to —20° F. to 0° F., maintaining the reaction mixture within this temperature range and substantially free from catalyst under a high degree of agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature between —40° F. and —150° F. resuming the introduction of catalyst into the reaction mixture, repeating the foregoing cycle several times then shutting off the supply of feed mixture, catalyst and refrigerant to the reactor, thoroughly cleansing the reactor surfaces with a heated solvent for the polymer formed, flushing out residual solvent, resuming the supply of refrigerant and feed mixture to the reactor and resuming the introduction of catalyst solution to the reactor when the contents reach reaction temperature between —40° F. and —150° F.

15. A polymerization process which comprises continuously supplying a reaction mixture comprising a major proportion of isobutylene and a minor proportion of butadiene in from an equal to a fivefold quantity of an alkyl halide containing less than 4 carbon atoms per molecule to a heat exchanger of reactor, cooling the reaction mixture to a temperature between —40° F. and —150° F. by supplying a suitable refrigerant in indirect heat exchange relation to the reaction mixture, adding a solution of a Friedel-Crafts catalyst in an alkyl halide containing less than 4 carbon atoms per molecule to the reaction mixture thereby polymerizing the reactants to solid polymers which are substantially insoluble in the reaction mixture even at temperatures of —20° F. to 0° F., discontinuing the addition of catalyst when the reactor surfaces become coated with a film of polymer, continuing the addition of reaction mixture and permitting the temperature of the reactor contents to rise to —20° F. to 0° F., maintaining the reaction mixture within this temperature range and substantially free from catalyst under agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature between —40° F. and —150° F., resuming the introduction of catalyst into the reaction mixture, repeating the foregoing cycle several times then shutting off the supply of feed mixture discharging the dispersed polymer and feed to means for separately recovering the dispersed polymer and the feed without contamination thereof, catalyst and refrigerant to the reactor, thoroughly cleansing the reactor surfaces with a heated solvent for the polymer formed, flushing out residual solvent, resuming the supply of refrigerant and feed mixture to the reactor and resuming the introduction of catalyst solution to the reactor when the contents reach reaction temperature between —40° F. and —150° F.

16. A polymerization process which comprises continuously supplying a reaction mixture comprising a major proportion of isobutylene and a minor proportion of isoprene in from an equal to a fivefold quantity of an alkyl halide containing less than 4 carbon atoms per molecule to a heat exchanger of reactor, cooling the reaction mixture to a temperature below about —40° F. by supplying a suitable refrigerant in indirect heat exchange relation to the reaction mixture, adding a solution of a Friedel-Crafts catalyst in an alkyl halide containing less than 4 carbon atoms per molecule to the reaction mixture thereby polymerizing the reactants to solid polymers which are substantially insoluble in the reaction mixture even at temperatures of about —20° F. to about 0° F., discontinuing the addition of catalyst when the reactor surfaces become coated with a film of polymer, continuing the addition of reaction mixture and permitting the temperature of the reactor contents to rise to about —20° F. to 0° F., maintaining the reaction mixture within this temperature range and substantially free from catalyst under a high degree of agitation until the polymer fouling the surfaces of the reactor is substantially completely dispersed in and carried away by the reaction mixture, cooling the reactor to reaction temperatures of below about −40° F., resuming the introduction of catalyst into the reaction mixture, repeating the foregoing cycle several times then shutting off the supply of feed mixture, catalyst and refrigerant to the reactor, thoroughly cleansing the reactor surfaces with a heated solvent for the polymer formed, flushing out residual solvent, resuming the supplying of refrigerant and feed mixture to the reactor and resuming the introduction of catalyst solution to the reactor when the contents reach reaction temperatures of below about −40° F.

17. A polymerization process which comprises continuously supplying a reaction mixture comprising a major proportion of isobutylene and a minor proportion of styrene in from an equal to a fivefold quantity of an alkyl halide containing less than 4 carbon atoms per molecule to a heat exchanger of reactor, cooling the reaction mixture to a temperature between −40° F. and −150° F. by supplying a suitable refrigerant in indirect heat exchange relation to the reaction mixture, adding a solution of a Freidel-Crafts catalyst in an alkyl halide containing less than 4 carbon atoms per molecule to the reaction mixture thereby polymerizing the reactants to solid polymers which are substantially insoluble in the reaction mixture even at temperatures of −20° F. to 0° F., discontinuing the addition of catalyst when the reactor surfaces become coated with a film of polymer, continuing the addition of reaction mixture and permitting the temperature of the reactor contents to rise to −20° F. to 0° F., maintaining the reaction mixture within this temperature range and substantially free from catalyst under agitation until the polymer fouling the surfaces of the reactor is substantially completely dispersed in and carried away by the reaction mixture discharging the dispersed polymer and feed to means for separately recovering the dispersed polymer and the feed without contamination thereof, cooling the reactor to reaction temperature between −40° F. and −150° F., resuming the introduction of catalyst into the reaction mixture, repeating the foregoing cycle several times then shutting off the supply of feed mixture, catalyst and refrigerant to the reactor, thoroughly cleansing the reactor surfaces with a heated solvent for the polymer formed, flushing out residual solvent, resuming the supply of refrigerant and feed mixture to the reactor and resuming the introduction of catalyst solution to the reactor when the contents reach reaction temperature between −40° F. and 150° F.

18. The process as defined in claim 15 wherein the alkyl halide is methyl chloride.

19. The process as defined in claim 16 wherein the alkyl halide is methyl chloride.

20. The process as defined in claim 17 wherein the alkyl halide is methyl chloride.

WILLIAM W. FORD.
FRED D. THIEL.

REFERENCES CITED

The following references are of record in the file of this patent:

UNITED STATES PATENTS

| Number | Name | Date |
|---|---|---|
| 2,085,524 | De Simo et al. | July 29, 1937 |
| 2,356,128 | Thomas et al. | Aug. 22, 1944 |